US012599893B2

(12) United States Patent
Wang et al.

(10) Patent No.: US 12,599,893 B2
(45) Date of Patent: Apr. 14, 2026

(54) SPHERICAL LITHIUM ADSORBENT AS WELL AS PREPARATION METHOD AND USE THEREOF

(71) Applicant: QINGHAI INSTITUTE OF SALT LAKES, CHINESE ACADEMY OF SCIENCES, Xining (CN)

(72) Inventors: Min Wang, Xining (CN); Xiaofei Lv, Xining (CN); Huaiyou Wang, Xining (CN)

(73) Assignee: QINGHAI INSTITUTE OF SALT LAKES, CHINESE ACADEMY OF SCIENCES, Xining (CN)

( * ) Notice: Subject to any disclaimer, the term of this patent is extended or adjusted under 35 U.S.C. 154(b) by 0 days.

(21) Appl. No.: 18/846,285

(22) PCT Filed: Nov. 4, 2022

(86) PCT No.: PCT/CN2022/129924
§ 371 (c)(1),
(2) Date: Sep. 12, 2024

(87) PCT Pub. No.: WO2024/092732
PCT Pub. Date: May 10, 2024

(65) Prior Publication Data
US 2025/0108357 A1      Apr. 3, 2025

(51) Int. Cl.
*B01J 20/30*        (2006.01)
*B01J 20/04*        (2006.01)
(Continued)

(52) U.S. Cl.
CPC ......... *B01J 20/3064* (2013.01); *B01J 20/041* (2013.01); *B01J 20/28004* (2013.01); *B01J 20/28019* (2013.01); *B05D 1/02* (2013.01)

(58) Field of Classification Search
CPC .......................... B01J 20/3064; B01J 20/041; B01J 20/28004; B01J 20/28019; B05D 1/02
See application file for complete search history.

(56) References Cited

FOREIGN PATENT DOCUMENTS

CN        109225124 A  *  1/2019  .............. B01J 20/04
CN        110227424 A     9/2019
(Continued)

OTHER PUBLICATIONS

Machine translation of CN-109225124-A (Year: 2019).*

*Primary Examiner* — Anthony J Zimmer
*Assistant Examiner* — Logan Laclair
(74) *Attorney, Agent, or Firm* — Bayramoglu Law Offices LLC

(57)        ABSTRACT

A spherical lithium adsorbent, as well as a preparation method and use thereof are provided. The preparation method includes: dry mixing an adsorbent and a forming agent followed by evenly mixing with a first solvent to form a mixed solution, and adding a thickening and pore forming agent to obtain a mixed system; spraying out the mixed system from a nozzle of a spray device and receiving sprayed drips using a second solvent that is incompatible with the forming agent as a receiving solvent so that the drips become particles to obtain a spherical adsorbent with good performance and even granularity. Spray granulation is performed utilizing airflow so that the particles have a larger specific area and are more suitable for industrial absorption column filling. Furthermore, adsorbent powders in the particles are tightly wrapped and difficult to fall off during cyclic use.

16 Claims, 4 Drawing Sheets

(51) Int. Cl.
    *B01J 20/28*          (2006.01)
    *B05D 1/02*          (2006.01)

(56)                    References Cited

FOREIGN PATENT DOCUMENTS

| | | | |
|---|---|---|---|
| CN | 112871126 A | 6/2021 |
| CN | 113842877 A | 12/2021 |
| CN | 113861454 A | 12/2021 |
| CN | 113967445 A | 1/2022 |
| CN | 113996274 A | 2/2022 |
| JP | 2020097011 A | 6/2020 |

* cited by examiner

SPHERICAL LITHIUM ADSORBENT AS WELL AS PREPARATION METHOD AND USE THEREOF

CROSS REFERENCE TO THE RELATED APPLICATIONS

This application is the national phase entry of International Application No. PCT/CN2022/129924, filed on Nov. 4, 2022, the entire contents of which are incorporated herein by reference.

TECHNICAL FIELD

The present application belongs to the technical field of new chemical material preparation, and particularly relates to a spherical lithium adsorbent as well as a preparation method and use thereof.

BACKGROUND

A lithium ion adsorbent is generally an inorganic compound powder, and has a nano size. The direct use of the lithium ion adsorbent for ion exchange column filling can cause increase in column pressure, and the powders are difficultly recovered. Therefore, the granulation process of the adsorbent powders becomes extremely important. The general powder granulation includes direct extrusion molding, polymerization granulation and spray granulation.

The direct extrusion molding is to mix adsorbent powders with granulated organic components to be dissolved into an organic solvent, extrude the obtained mixture and add it into water, so as to form a large-particle adsorbent, that is to say, adsorbent powders and other components are physically mixed to form a large block shape or long strip shape which is further cut or broken as needs. The Chinese patent CN113842877A discloses a preparation method of a carbon based adsorbent particle for liquid lithium resource extraction, in which a high-strength water-absorbing particle is prepared by extrusion granulation of a water-absorbing resin and utilizing a secondary cross-linking process, and then carbonized to prepare the carbon based adsorbent particle. There is no need to add a binder in the formation process of the adsorbent particle. Although the extrusion granulation is efficient and convenient, particle compactness is high in the process of extrusion. The adsorption capacity is reduced due to the compressed pore channels of particles.

The polymerization granulation is also referred to as polymerization molding. On the one hand, the polymerization molding includes: a polymer monomer is mixed adsorbent powders, the adsorbent powders are wrapped in the process of polymer granulation, and on the other hand, the polymer monomer and the adsorbent are subjected to direct chemical grafting to generate novel adsorbent particles. The polymerization granulation can freely and conveniently control the size and pore structure of the adsorbent particle. However, since most of the inorganic compound powders are difficult to stably bind to polymers, a physical loading manner is generally used, which leads to a fact that actual adsorption components in the particle are too few, but the polymer itself cannot achieve the effect of specialized adsorption. The Chinese patent CN113996274A discloses a preparation method of a porous composite lithium adsorbent, in which inorganic lithium adsorbent powders, a polymer skeleton material and auxiliary agents are evenly mixed with a volatile organic solvent and a water-soluble organic solvent to obtain a composite lithium adsorbent precursor mixture. After granulation, the mixture is placed in an atmosphere environment with a certain flow rate, humidity and temperature to obtain a porous composite lithium adsorbent. To ensure the stable performance of the lithium adsorbent, the proportion of the polymer skeleton material is too high, which causes reduction in adsorption performance of the material. However, a novel lithium adsorption material can also be obtained through proper grafting polymerization. The Chinese patent CN110227424A discloses a method for preparing a covalently modified high-density crown ether functionalized porous adsorbent in which a porous polymer PVBC and a porous polymer grafted with polyglycidyl methacrylate on the surface are mixed in an organic solvent, then a crown ether monomer is added, the obtained product is washed with DMF, ethanol and double distilled water in sequence after a water bath reaction, an aminoethylbenzene-12-crown-4 modified porous adsorbent is prepared after vacuum drying, and such the polymer material can increase the specific lithium adsorption sites. However, the grafted polymers and crown ether monomers are expensive in cost and insufficient in stability.

Spray granulation is to allow an adsorbent solution to fall into a receiving container in a form of mist by utilizing airflow or electrostatic attraction, during which, filling particles can also be formed by drying or via phase conversion. Spray granulation generally includes electrostatic spray and airflow spray. The Chinese patent CN113861454A discloses a polyimide/silica composite microsphere coated with a silicon dioxide shell layer on the surface and a preparation method thereof. The polyimide/silicon dioxide has a structure with polyimide@silicon dioxide as a composite core and silicon dioxide as a shell, an electrostatic spray technology is used to prepare a polyimide microsphere containing a silicon dioxide precursor, and then the polyimide/silica composite microsphere is finally obtained by hydrolysis and thermal imidization treatment. The diameter of such the composite microsphere is controllable in a range from 20 nm to 10 μm, and evenly coated with a silicon dioxide inorganic nano layer, and the thickness of the shell layer is controllable in a range from 5 nm to 500 nm. Moreover, the device required for electrostatic spray is complicated in process and expensive cost. The Chinese patent CN113967445A discloses a spray granulation device and method, in the device, a granulation cylinder and a diaphragm pump are linked together, the diaphragm pump is located under the granulation cylinder, a sprayer penetrating through the center of a circle at the bottom end of the granulation cylinder is connected with the output end of the diaphragm pump, one side of the diaphragm pump is provided with a weight loss scale component, the output end of the weight loss scale component is connected with the input end of the diaphragm pump, one side of the granulation cylinder is in rotary connection with a rotary slot, and this interlocking equipment can efficiently treat ceramic particles. At present, spray granulation is not used for preparation of a lithium adsorbent, and the preparation device of the adsorbent particles is generally designed by reference to a spray preparation method of drug particles.

For various technological means of granulation, except for considering the cost of process equipment, it is also necessary to consider whether the particles have acid and base resistance and a certain mechanical strength. At present, physical mixing granulation is still an irreplaceable preparation method of adsorbent particles.

SUMMARY

The main objective of the present application is to provide a preparation method of a spherical lithium adsorbent in order to overcome the defects in the prior art.

Another objective of the present application is to provide a spherical lithium adsorbent prepared by the above preparation method.

In addition, the present application also provides use of the spherical lithium adsorbent in adsorption column filling.

To achieve the above objectives of the present disclosure, the present application adopts the following technical solution:

The present application provides a preparation method of a spherical lithium adsorbent, comprising:

dry mixing an adsorbent and a forming agent followed by evenly mixing with a first solvent to form a mixed solution, and adding a thickening and pore forming agent to obtain a mixed system; and spraying out the mixed system from a nozzle of a spray device and receiving sprayed drips using a second solvent that is incompatible with the forming agent as a receiving solvent so that a solid-phase spherical lithium adsorbent is obtained via phase conversion.

In some specific embodiments, the adsorbent and the forming agent are evenly dry mixed, and then the obtained mixture is added into the first solvent being in a stirring state to form the mixed solution.

In some specific embodiments, the thickening and pore forming agent is dissolved into a third solvent and then added into the mixed solution, stirred and ultrasonically treated to obtain the mixed system.

In some specific embodiments, the mixed system is extracted by using an extraction device to be input into a first inlet of a spray device, and a gas is introduced into a second inlet; the mixed system is sprayed out via a nozzle of the spray device, the second solvent that is incompatible with the forming agent is used as the receiving solvent of the sprayed drips, such that the sprayed drips fall in the second solvent, so as to obtain a solid-phase spherical lithium adsorbent via phase conversion.

Another objective of the present application is to provide the spherical lithium adsorbent prepared by the above preparation method. The particle size of the spherical lithium adsorbent is in submillimeter level, preferably is 100 μm-1000 μm.

The present application also provides use of the spherical lithium adsorbent in the field of absorption column filling.

The adsorbent particles are loaded into a column after being subjected to suction filtration and weighing for dynamic adsorption experiment. The experiment aims to verify the effects of adsorption and desorption. In the present application, materials required for column filling during the dynamic adsorption undergo suction filtration until there is no water on the surfaces of microsphere particles. Furthermore, when the content of water in the particles is 60%-70%, the opening of the microsphere pores is ensured so as to perform sufficient adsorption behavior.

Compared with the prior art, the present application at least has the following beneficial effects:

1) The present application overcomes the problems of small specific surface area and low adsorption capacity caused by too large particles produced by physical wrapping granulation, spray granulation makes the size of adsorbent particles adjustable, the adsorbent particle has a particle size of 100 μm-1000 μm and a completed spherical shape and is suitable for industrial adsorbent column filling.

2) The present application utilizes the dry mixing method for granulation, in such the way, the amount of the plasticizing and forming agent can be significantly reduced, with saved cost. Meanwhile, the proportion of the adsorbent powder can be increased and can be up to 90%, thereby sufficiently exerting the adsorption effect, and efficiently utilizing the adsorbent.

3) The present application utilizes equipment to control the granulation process, and a mature process verified through experiments is efficient, fast, and conducive to production, thereby ensuring the production of adsorbent particles.

4) The particle adsorbent prepared in the present application has acid and base resistance and high pressure and temperature resistance, is stable in performance, and is suitable for cyclic use in actual production.

BRIEF DESCRIPTION OF THE DRAWINGS

To provide a clearer explanation of the embodiments or technical solutions in the present application or in the prior art, a brief introduction will be given to the drawings required for the embodiments or description of the prior art, obviously, the drawings in the following description are only some embodiments in the present application, and other drawings are obtained by persons of ordinary skill in the art without create labor efforts according to these drawings.

DETAILED DESCRIPTION OF THE EMBODIMENTS

Figure 1:
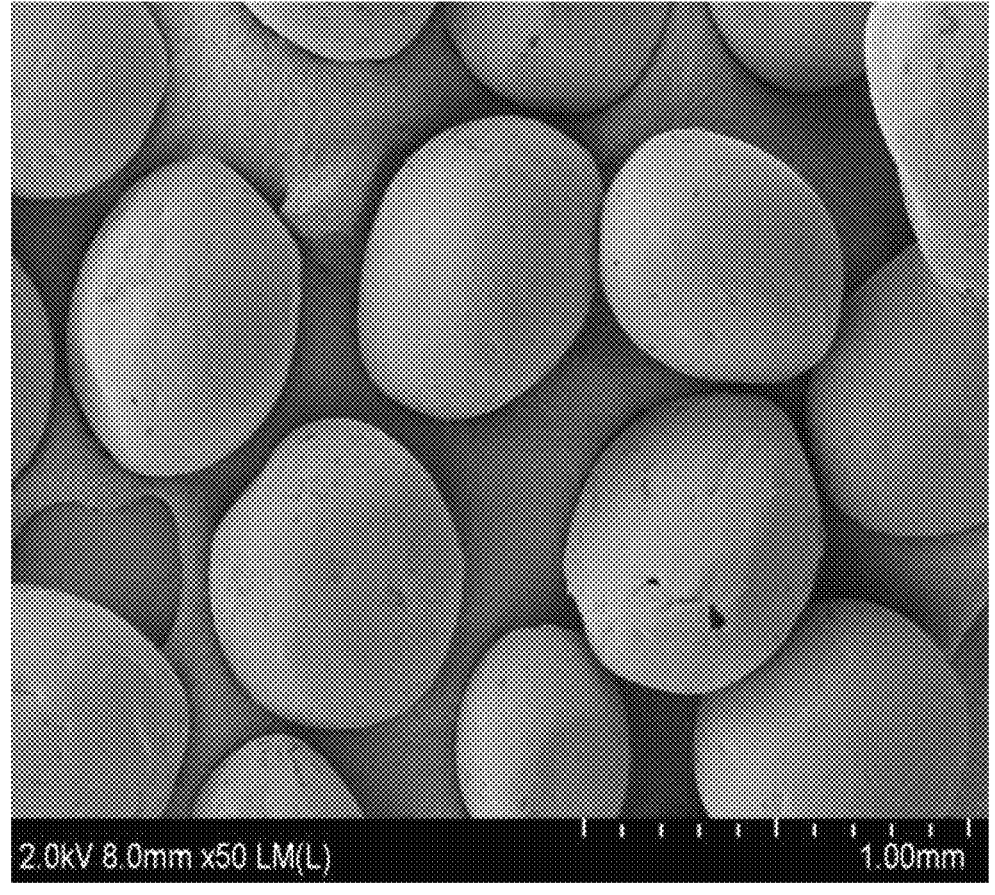
FIG. 1 is a 1 mm scanning electron microscopy image of an adsorbent particle finished product obtained in a typical embodiment.
Figure 2:
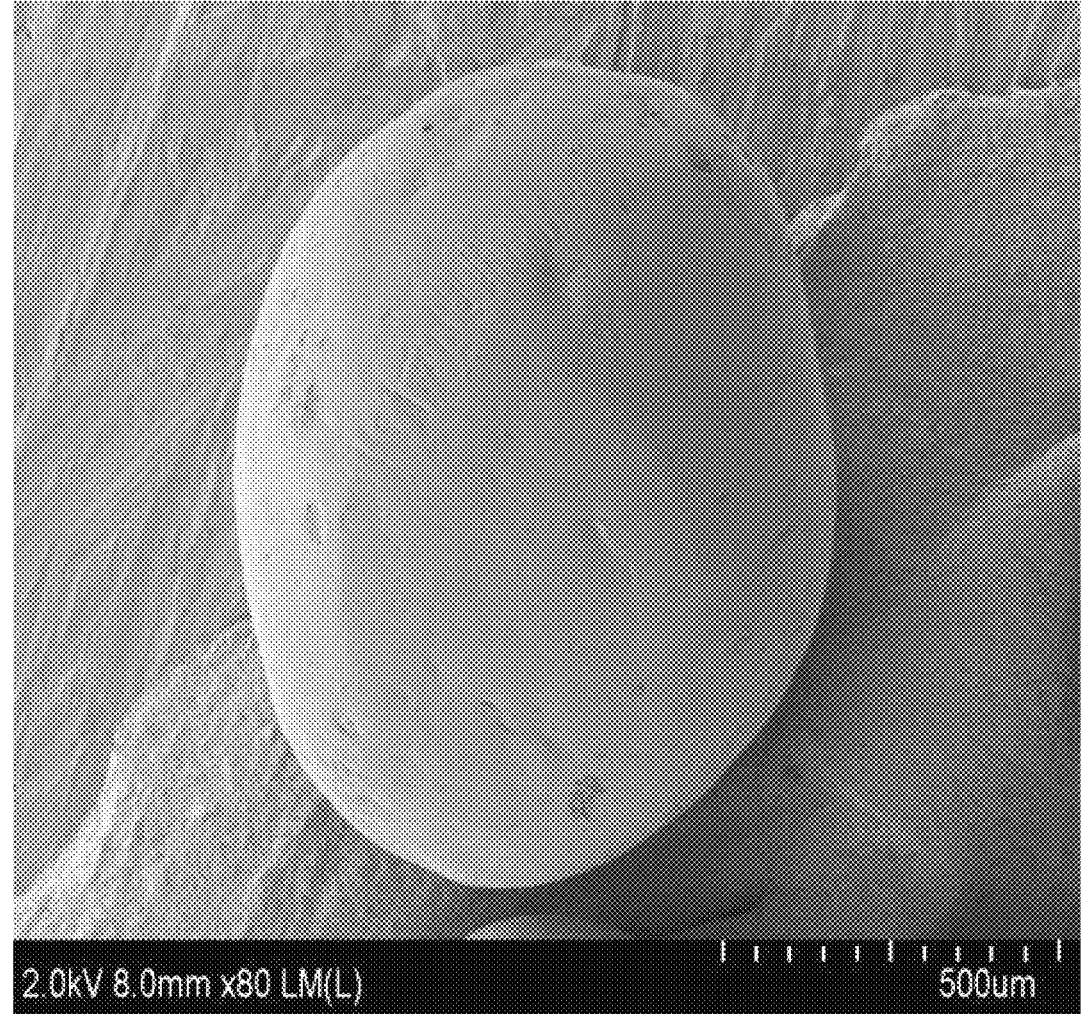
FIG. 2 is a 500 m scanning electron microscopy image of an adsorbent particle finished product obtained in a typical embodiment.
Figure 3:
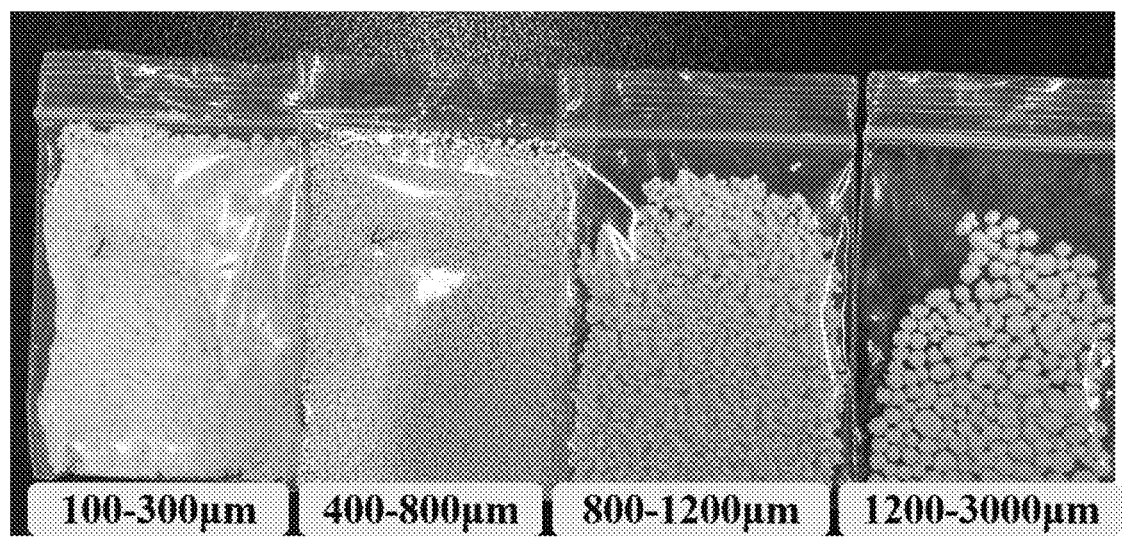
FIG. 3 is a graph of adsorbent particle samples with different sizes.

In views of the defects in the prior art, the inventor of this case proposes the technical solution of the present application through long-term research and lots of practices. Spray granulation is conducted mainly based on a phase separation method by utilizing airflow, that is, an adsorbent component and a forming agent are dissolved into an organic solvent so as to utilize an incompatible solvent for replacement so that drips become particles to obtain a spherical adsorbent with good performance and uniform particle size.

Specifically, the preparation method of a submillimeter-level spherical adsorbent disclosed in the present application comprises: dissolving an adsorbent component and a forming agent into an organic solvent according to a phase separation method based on a hydroxyl/methyl-containing cellulose and a water-soluble inorganic salt as a pore forming agent, a thermoplastic resin as a forming agent and lithium-ion adsorbent powders as a main adsorption component so as to utilize an incompatible solvent for replacement so that drips become particles. In this method, the adsorbent component can account for 80%-90% of dry adsorbent particles, which can maximize the adsorption effect of the adsorbent. Furthermore, on the one hand, the design of a pore forming formula can increase the proportion of the adsorbent component and on the other hand increase the specific surface area of the spherical particle, and optimization of the process design can obtain a spherical adsorbent with good performance and uniform particle size.

In this method, spray granulation is conducted by utilizing airflow. Through optimization of process parameters and microcosmic regulation of particle size, the particles have larger specific area and are more suitable for industrial adsorption column filling, and during the recycling, the adsorbent powders in the particles are tightly wrapped and difficult to fall off.

The spherical adsorbent prepared by this method is filled in the adsorption column and can resist acid, base, high temperature and pressure. Relative to problems that the adsorbent powders are easy for solution loss, difficult to recover and the like when in elution, the submillimeter-level spherical adsorbent prepared by this method is not prone to mass loss, and is convenient and efficient in acid washing and desorption treatment.

As one aspect of the technical solution of the present application, a preparation method of a spherical lithium adsorbent comprises:

dry mixing an adsorbent and a forming agent followed by evenly mixing with a first solvent to form a mixed solution, and adding a thickening and pore forming agent to obtain a mixed system; and spraying out the mixed system from a nozzle of a spray device and receiving sprayed drips using a second solvent that is incompatible with the forming agent as a receiving solvent so that a solid-phase spherical lithium adsorbent is obtained via phase conversion.

In some specific embodiments, the adsorbent and the forming agent are dry mixed evenly, and then the obtained mixture is added into the first solvent being in a stirring state to form the mixed solution.

Further, the adsorbent is a combination of any one or more than two of powders with lithium-specific adsorption effects, such as a lithium titanium ion sieve, an aluminum based adsorbent, a lithium manganese ion sieve, graphite powders and graphene oxide.

More further, the aluminum based adsorbent is a combination of any one or two of laminar Li/Al LDH-Cl, such as $LiCl \cdot 2Al(OH)_3 \cdot nH_2O$ and $LiAl_2 (OH)_6Cl \cdot nH_2O$.

Further, the forming agent comprises a combination of any one or more than two of polyvinyl chloride, polyethersulfone, polyvinyl acetate, polyformaldehyde, polyamide, polysulfone, polyimide and the like.

Further, the weight ratio of the adsorbent to the forming agent is 1:1-9:1.

Further, the first solvent mainly comprises a combination of any one or more than two of N-methylpyrrolidone, N,N-dimethylformamide, N,N-dimethylacetamide, tetrahydrofuran and the like.

Further, the forming agent accounts for 6%-40% by weight of the first solvent.

In some specific embodiments, the thickening and pore forming agent is dissolved into the third solvent, and then the obtained mixture is added into the mixed solution and then the mixed system is obtained by stirring and ultrasonic treatment.

Further, the thickening and pore forming agent comprises a combination of any one or more than two of hydroxyethyl cellulose, sodium carboxymethyl cellulose, polyethylene glycol, sodium alginate and the like, but is not limited thereto. The ultrasonic time is 4-8 h, and the ultrasonic frequency is 20-50 Hz.

Further, the mass ratio of the thickening and pore forming agent to the forming agent is 6:100-1:3. By regulating the proportions of the thickening and pore forming agent and the forming agent, relatively stable bubble grids are generated so as to tightly wrap adsorbent powders; in addition, a suitable thickening and pore forming agent is selected and the specific surface area of the adsorbent particle is enlarged through dissolution and pore formation, which is beneficial for sufficient contact of particles on an adsorbate. In the feed liquid, these components play roles in increasing the density and promoting the viscosity. During the formation, these components take an effect of regulating the pore channel structure of the particles.

Further, the third solvent comprises a combination of any one or more than two of ethanol, cyclohexanol, isopropanol and the like.

Further, the thickening and pore forming agent accounts for 3%-10% by weight of the dry mixing powder. When the thickening and pore forming agent accounts for 3%-10% by weight of the dry mixing powder, the formation of particles is not affected with a good pore forming effect.

Further, the thickening and pore forming agent accounts for 10%-80% by weight of the third solvent. After slurry is formed by evenly mixing, the slurry is dropwise added in to the dry mixed solution.

Further, the second solvent (receiving solvent) comprises a combination of any one or two of alcohol and water. Through consideration of the density and solubility of the solvent, a proper receiving solvent is prepared. When airflow spraying is used for granulation, it is crucial for the selection of the forming agent and the receiving agent. Since the density of drips sprayed out via airflow is relatively small, the receiving solvent needs smaller density so that the drips become spherical particles to be precipitated into the bottom of the solution. By controlling the airflow and liquid extraction speed, the particle size of the spherical particle can be directly controlled. On the one hand, the receiving solvent allows the drips to be cured, and on the other hand makes the thickening and pore forming component efficient dissolve out to form a loose pore channel and then increase the specific area of the particle, so that the spherical particle has more adsorption sites, thereby promoting the adsorption performance.

Further, the alcohol comprises a combination of any one or more than two of methanol, n-propanol, isopropanol and ethanol. Further, the water is deionized water, and the volume ratio of the alcohol to the water is 30:70-90:10.

In some specific embodiments, the mixed system is extracted by using the extraction device to be input into the first inlet of the spray device, and a gas is introduced into the second inlet.

The mixed system is sprayed out via the nozzle of the spray device, and the sprayed drips fall into the second solvent by using the second solvent that is incompatible with the forming agent as the receiving solvents. The solid-phase spherical lithium adsorbent is obtained via phase conversion, the process device is efficient, fine drips are blown into the receiving solvent by utilizing a gas through series connection design of an airflow port and a spraying port, so as to reduce the device process cost, and the process is efficient and labor-saving.

In some more specific embodiments, the spraying preparation method of the spherical lithium adsorbent comprises the following steps:

(1) preparing A solution (i.e., the above "mixed system"): dissolving by a dry mixing method, evenly dry mixing an adsorbent powders and a forming agent in a container in a proportion, adding an organic solvent for dissolving dry mixed powders in a stirring device, adding the dry mixed powders into the organic solvent after the rotation speed of a stirring blade is adjusted, so that even dissolution is ensured without caking, dissolving a thickening and pore forming agent with a small capacity of solvent in advance for later use, and slowly dropwise adding a pore forming feed liquid into the dry mixed solution, stirring and ultrasonically treating for a certain time.

(2) Preparing B solution (i.e., the above "second solvent"): selecting a solvent that is incompatible with the forming agent as a receiving solvent for sprayed drips.

The A solution is extracted in a certain flow speed via a dual-port spray gun, a gas is introduced via another port, an air speed is controlled, the receiving container is located below, and the container is equipped with a prepared receiving solution B. The drips of the A solution is sprayed out from a spray nozzle via the gas and then fall into the receiving solution, replacing the organic solvent for dissolving the forming agent in the drips with the receiving solution B via phase conversion, wherein the forming agent is not dissolved into the solution B, thereby forming solid particles.

Where, the dry mixing ratio refers to weighing the adsorbent powders and the forming agent in a ratio of 1:1-9:1 and even mixing the two materials.

In some more specific embodiments, a ratio of the extraction speed (marked as $v_1$) of the extraction device to the airflow speed (marked as $v_2$) of the air is 1:2-5:1. The extraction speed v1 of the extraction device and the airflow speed v2 of the air are adjusted according to different models. When a ratio of the extraction speed v1 of the extraction device to the airflow speed v2 of the air is 1:2-5:1, the sprayed particle is completed in sphere shape and concentrated in size distribution. When the speed ratio is 1:2-1:1, the sprayed particle is relatively fine, the size distribution is 100-400 m; when the speed ratio is 1:1-2:1, the size distribution of the sprayed particle is 400-800 m; when the speed ratio is 2:1-5:1, the size distribution is 0.8-3 mm.

Further, the gas comprises a combination of any one or more than two of air, carbon dioxide, nitrogen and argon.

In the present application, the adsorbent particle is subjected to elution pretreatment with a hydrochloric acid solution after being subjected to suction filtration until there is no water on the surface, and then a lithium-containing solution is extracted for a dynamic adsorption experiment. The adsorption saturation volume and saturation adsorption capacity are measured, and desorption is conducted by using the hydrochloric acid solution, and the elution rate of Li is determined.

Further, the adsorbent particles are loaded onto a column for a dynamic adsorption experiment after being subjected to suction filtration and weighing to verify the effects of adsorption and desorption. In the present application, a material required for column filling during the dynamic adsorption is subjected to suction filtration until there is no water on the surface of the microsphere particle, and it is ensured that the pore channel of the microsphere is opened for sufficient adsorption behavior when the content of water in the particle is 60%-70%.

Next, the technical solution of the present application will be described in detail in combination with several preferred embodiments, obviously, the described embodiments are only some embodiments of the present application, but not all the embodiments. It is noted that the following examples are intended to facilitate the understanding of the present application without any limitation. Based on the embodiments of the present application, other embodiments obtained by persons of ordinary skill in the art without creating efforts are all included within the scope of protection of the present application. The experimental methods in the following examples that do not specify specific conditions are usually carried out under conventional conditions or according to the conditions recommended by the manufacturer.

Example 1

1000 g of aluminum based adsorbent LiCl·2Al(OH)$_3$·nH$_2$O was smashed and then evenly dry mixed with 180 g of polyethersulfone, the obtained mixture was added into a beaker containing 3000 g of N-methylpyrrolidone to be ultrasonically treated and stirred, a dissolved pore forming component was added into the beaker, at this moment, solution A selected N-methylpyrrolidone, solvent B selected a mixture of methanol and water, and a ratio of methanol to water was 30:70. The solution mixed with N-methylpyrrolidone was sprayed out via a gas after being extracted to be dropped into a mixed solvent of methanol and water, so as to form a solid microsphere.

Example 2

180 g of aluminum based adsorbent Li Al$_2$ (OH)$_6$C3·nH$_2$O was smashed and then evenly dry mixed with 180 g of polyethersulfone, the obtained mixture was added into a beaker containing 450 g of N-methylpyrrolidone to be ultrasonically treated and stirred, a dissolved pore forming component was added into the beaker, at this moment, solution A selected N-methylpyrrolidone, solvent B selected a mixture of methanol and water, and a ratio of methanol to water was 30:70. The solution mixed with N-methylpyrrolidone was sprayed out via a gas after being extracted to be dropped into a mixed solvent of methanol and water, so as to form a solid microsphere.

Example 3

1000 g of titanium ion sieve was smashed and then evenly dry mixed with 180 g of polyvinyl chloride, the obtained mixture was added into a beaker containing 3000 g of dimethylformamide to be ultrasonically treated and stirred, a dissolved pore forming component was added into the beaker, at this moment, solution A selected N-methylpyrrolidone, solvent B selected a mixture of ethanol and water, and a ratio of ethanol to water was 70:30. The solution mixed with N-methylpyrrolidone was sprayed out via a gas after being extracted to be dropped into a mixed solvent of ethanol and water, so as to form a solid microsphere.

Example 4

1000 g of manganese ion sieve was smashed and then evenly dry mixed with 180 g of polyvinyl acetate, the obtained mixture was added into a beaker containing 3000 g of tetrahydrofuran to be ultrasonically treated and stirred, a dissolved pore forming component was added into the beaker, at this moment, solution A selected tetrahydrofuran, solvent B selected a mixture of isopropanol and water, and a ratio of isopropanol to water was 60:40. The solution mixed with tetrahydrofuran was sprayed out via a gas after being extracted to be dropped into a mixed solvent of isopropanol and water, so as to form a solid microsphere.

Example 5

1000 g of graphite powders was smashed and then evenly dry mixed with 180 g of polyamide, the obtained mixture was added into a beaker containing 3000 g of dimethylacetamide to be ultrasonically treated and stirred, a dissolved pore forming component was added into the beaker, at this moment, solution A selected dimethylacetamide, solvent B selected a mixture of methanol and water, and a ratio of methanol to water was 30:70. The solution mixed with dimethylacetamide was sprayed out via a gas after being extracted to be dropped into a mixed solvent of methanol and water, so as to form a solid microsphere.

Example 6

100 g of graphene oxide was smashed and then evenly dry mixed with 18 g of polyformaldehyde, the obtained mixture was added into a beaker containing 300 g of dimethylacetamide to be ultrasonically treated and stirred, a dissolved pore forming component was added into the beaker, at this moment, solution A selected dimethylacetamide, solvent B selected a mixture of n-propanol and water, and a ratio of n-propanol to water was 60:40. The solution mixed with dimethylacetamide was sprayed out via a gas after being extracted to be dropped into a mixed solvent of n-propanol and water, so as to form a solid microsphere.

TABLE 1

Formulation of first solvent and second solvent

| First solvent | Second solvent | | | |
| --- | --- | --- | --- | --- |
| | Methanol:water | Ethanol:water | Isopropanol:water | n-propanol:water |
| N-methylpyrrolidone | 30:70-60:40 | 50:50-70:30 | — | — |
| Tetrahydrofuran | 70:30-90:10 | 60:40-85:15 | 60:40-85:15 | 70:30-80:20 |
| Dimethylformamide | 30:70-60:40 | 40:60-50:50 | — | — |
| Dimethylacetamide | 30:70-70:30 | 30:70-70:30 | — | 40:60-60:40 |

The selection criterion of the second solvent is to ensures that the density of the second solvent is smaller than that of the first solvent, in such a way, the drips cannot be attached to the surface of the solvent, but sink into the solvent by gravity so as to complete phase conversion, but N-methylpyrrolidone, tetrahydrofuran, dimethylformamide and dimethylacetamide have different densities. Although the density of the feed liquid added with the adsorbent powders, the forming agent and the pore forming agent is generally greater than 1 g/cm³, it is needed to compound an alcohol solvent with water in a certain ratio to achieve a smaller density value in order to ensure the smaller density of the second solvent and more complete particle conversion. After formulation is performed according to Table 1, the first solvent can sufficiently dissolve the molding agent and is evenly mixed with the adsorbent and the thickening and pore forming agent to form a viscous feed liquid. Due to insolubility in water, methanol, ethanol, n-propanol and isopropanol, the drips in the second solvent are solidified into particles. Moreover, due to smaller density of the second solvent, the drips can quickly sink to complete phase conversion no matter what they are sprayed into the second solvent from any direction or height.

TABLE 2

Density parameters of solvent

| First solvent | Density (g/cm³) | Second solvent | Density (g/cm³) |
| --- | --- | --- | --- |
| N-methylpyrrolidone | 1.028 | Methanol | 0.791 |
| N-methylformamide | 0.873 | Ethanol | 0.789 |

TABLE 2-continued

Density parameters of solvent

| First solvent | Density (g/cm³) | Second solvent | Density (g/cm³) |
| --- | --- | --- | --- |
| N-methylacetamide | 0.957 | Isopropanol | 0.785 |
| Tetrahydrofuran | 0.8992 | n-propanol | 0.804 |

Example 7

30 g of titanium based adsorbent powders was evenly mixed with 30 g of polyvinyl chloride, the obtained mixture was added into a beaker containing 400 g of N-methylpyrrolidone to be ultrasonically and stirred, 1.8 g of hydroxyethyl cellulose was dissolved into 10 mL of ethanol to be evenly dispersed, the obtained mixture was dropwise added into the N-methylpyrrolidone solution, the mixed solution was stirred and subjected to ultrasonic dispersion for 4 h, then the flow speed of the mixed solution was adjusted to 15 mL/min, the speed of the airflow was adjusted to 17 mL/min, a container was prepared under an spray outlet, the formulated mixed solvent of the receiving solution methanol and water was stirred, at this moment, the sprayed drips were solidified into spherical particles.

Example 8

180 g of titanium based adsorbent powders was evenly mixed with 180 g of polyvinyl chloride, the obtained mixture was added into a beaker containing 1800 g of N-methylpyrrolidone to be ultrasonically treated and stirred, 15 g of sodium carboxymethyl cellulose was dissolved into 100 mL of ethanol, i.e., a third solvent containing 15% of pore forming agent was formulated and evenly dispersed by stirring, the dissolved mixture was dropwise added into the N-methylpyrrolidone solution, the mixed solution was stirred and subjected to ultrasonic dispersion for 4 h, then the flow speed of the mixed solution was adjusted to 15 mL/min, the speed of the airflow was adjusted to 17 mL/min, a container was prepared under an spray outlet, the formulated mixed solvent of the receiving solution methanol and water was stirred, at this moment, the sprayed drips were solidified into spherical particles.

Example 9

1000 g of graphite powders was evenly mixed with 180 g of polyethersulfone, the obtained mixture was added into a beaker containing 3000 g of N-methylpyrrolidone to be ultrasonically treated and stirred, 50 g of sodium alginate was dissolved into 100 mL of isopropanol, i.e., a third solvent containing 50% of pore forming agent was formulated and evenly dispersed by stirring, the dissolved mixture was dropwise added into the N-methylpyrrolidone solution, the mixed solution was stirred and subjected to ultrasonic dispersion for 4 h, then the flow speed of the mixed solution was adjusted to 15 mL/min, the speed of the airflow was adjusted to 17 mL/min, a container was prepared under an spray outlet, the formulated mixed solvent of the receiving solution methanol and water was stirred, at this moment, the sprayed drips were solidified into spherical particles.

Example 10

1000 g of magnanese based adsorbent powders was evenly mixed with 180 g of polyethersulfone, the obtained mixture was added into a beaker containing 3000 g of N-methylpyrrolidone to be ultrasonically treated and stirred, 36 g of hydroxyethyl cellulose was dissolved into 50 mL of cyclohexanol, i.e., a third solvent containing 72% of pore forming agent was formulated and evenly dispersed by stirring, the dissolved mixture was dropwise added into the N-methylpyrrolidone solution, the mixed solution was stirred and subjected to ultrasonic dispersion for 4 h, then the flow speed of the mixed solution was adjusted to 15 mL/min, the speed of the airflow was adjusted to 17 mL/min, a container was prepared under an spray outlet, the formulated mixed solvent of the receiving solution methanol and water was stirred, at this moment, the sprayed drips were solidified into spherical particles.

Example 11

50 g of graphene oxide was evenly mixed with 50 g of polyethersulfone, the obtained mixture was added into a beaker containing 500 g of N-methylpyrrolidone to be ultrasonically treated and stirred, 10 g of hydroxyethyl cellulose was dissolved into 20 mL of cyclohexanol, at this moment, the pore forming agent accounted for 10% of dry mixed powders, the above materials were evenly dispersed by stirring and then dropwise added into the N-methylpyrrolidone solution, the mixed solution was stirred and subjected to ultrasonic dispersion for 4 h, then the flow speed of the mixed solution was adjusted to 15 mL/min, the speed of the airflow was adjusted to 17 mL/min, a container was prepared under an spray outlet, the formulated mixed solvent of the receiving solution methanol and water was stirred, at this moment, the sprayed drips were solidified into spherical particles.

Example 12

50 g of manganese based adsorbent powders and 50 g of polyethersulfone were evenly dry mixed in a ratio of 1:1, the obtained mixture was added into a beaker containing 125 g of dimethylformamide, at this moment, a forming agent accounted for 40% by weight of a first solvent. 5 g of hydroxyethyl cellulose was dissolved into 50 mL of cyclohexanol and evenly dispersed by stirring, the dissolved mixture was dropwise added into the N-methylpyrrolidone solution, the mixed solution was stirred and subjected to ultrasonic dispersion for 4 h, then the flow speed of the mixed solution was adjusted to 15 mL/min, the speed of the airflow was adjusted to 17 mL/min, a container was prepared under an spray outlet, the formulated mixed solvent of the receiving solution methanol and water was stirred, at this moment, the sprayed drips were solidified into spherical particles.

Example 13

50 g of manganese based adsorbent powders were evenly dry mixed with 10 g of polyethersulfone and 10 g of polyvinyl chloride in a ratio of 2.5:1, the obtained mixture was added into a beaker containing 200 g of dimethylformamide, at this moment, a forming agent accounted for 10% by weight of a first solvent. 2.1 g of hydroxyethyl cellulose was dissolved into 21 mL of cyclohexanol to be evenly dispersed by stirring, the dissolved mixture was dropwise added into the N-methylpyrrolidone solution, the mixed solution was stirred and subjected to ultrasonic dispersion for 4 h, then the flow speed of the mixed solution was adjusted to 15 mL/min, the speed of the airflow was adjusted to 17 mL/min, a container was prepared under an spray outlet, the formulated mixed solvent of the receiving solution methanol and water was stirred, at this moment, the sprayed drips were solidified into spherical particles.

Example 14

100 g of titanium based adsorbent powders were evenly dry mixed with 20 g of polyethersulfone in a ratio of 5:1, the obtained mixture was added into a beaker containing 250 g of dimethylformamide, at this moment, a forming agent accounted for 8% by weight of a first solvent. 3.6 g of hydroxyethyl cellulose was dissolved into 36 mL of cyclohexanol to be evenly dispersed by stirring, the dissolved mixture was dropwise added into the N-methylpyrrolidone solution, the mixed solution was stirred and subjected to ultrasonic dispersion for 4 h, then the flow speed of the mixed solution was adjusted to 15 mL/min, the speed of the airflow was adjusted to 17 mL/min, a container was prepared under an spray outlet, the formulated mixed solvent of the receiving solution methanol and water was stirred, at this moment, the sprayed drips were solidified into spherical particles.

Example 15

90 g of graphite powders were evenly dry mixed with 10 g of polyethersulfone in a ratio of 9:1, the obtained mixture was added into a beaker containing 167 g of dimethylformamideto be ultrasonically treated and stirred, at this moment, a forming agent accounted for 6% by weight of a first solvent. 3 g of hydroxyethyl cellulose was dissolved into 30 mL of cyclohexanol to be evenly dispersed by stirring, the dissolved mixture was dropwise added into the N-methylpyrrolidone solution, the mixed solution was stirred and subjected to ultrasonic dispersion for 4 h, then the flow speed of the mixed solution was adjusted to 15 mL/min, the speed of the airflow was adjusted to 17 mL/min, a container was prepared under an spray outlet, the formulated mixed solvent of the receiving solution methanol and water was stirred, at this moment, the sprayed drips were solidified into spherical particles.

Example 16

1000 g of adsorbent powders was evenly mixed with 180 g of polysulfone, the obtained mixture was added into a beaker containing 3000 g of N-methylpyrrolidoneto be ultrasonically treated and stirred, 50 g of polyethylene glycol was dissolved into 62.5 mL of isopropanol, the dissolved mixture was dropwise added into the N-methylpyrrolidone solution, the mixed solution was stirred and subjected to ultrasonic dispersion for 4 h, then the flow speed of the mixed solution was adjusted to 5 mL/min, the speed of the airflow was adjusted to 10 mL/min, a container was prepared under an spray outlet, i.e., the liquid flow rate: airflow rate=1:2, the formulated mixed solvent of the receiving solution methanol and water was stirred, at this moment, the sprayed drips were solidified into spherical particles with a particle size of 100-300 m, as shown in FIG. 1.

Example 17

1000 g of adsorbent powders was evenly mixed with 180 g of polyimide, the obtained mixture was added into a beaker containing 3000 g of N-methylpyrrolidoneto be ultrasonically treated and stirred, 50 g of hydroxyethyl cellulose was dissolved into 62.5 mL of isopropanol to prepare a third solvent containing 80% of pore forming agent to be evenly dispersed by stirring, the dissolved mixture was dropwise added into the N-methylpyrrolidone solution, the mixed solution was stirred and subjected to ultrasonic dispersion for 4 h, then the flow speed of the mixed solution was adjusted to 10 mL/min, the speed of the airflow was adjusted to 10 mL/min, a container was prepared under an spray outlet, i.e., the liquid flow rate: airflow rate=1:1, a container was prepared under the spray outlet, the formulated mixed solvent of the receiving solution methanol and water was stirred, at this moment, the sprayed drips were solidified into spherical particles with a particle size of 400-800 m, as shown in FIG. 1.

Example 18

1000 g of adsorbent powders was evenly mixed with 100 g of polyimide and 80 g of polyvinyl chloride, the obtained mixture was added into a beaker containing 3000 g of N-methylpyrrolidoneto be ultrasonically treated and stirred, 50 g of hydroxyethyl cellulose was dissolved into 62.5 mL of isopropanol, the dissolved mixture was dropwise added into the N-methylpyrrolidone solution, the mixed solution was stirred and subjected to ultrasonic dispersion for 4 h, then the flow speed of the mixed solution was adjusted to 22 mL/min, i.e., the speed of the airflow was adjusted to 10 mL/min, i.e., the liquid flow rate: airflow rate=2.2:1, a container was prepared under an spray outlet, the formulated mixed solvent of the receiving solution methanol and water was stirred, at this moment, the sprayed drips were solidified into spherical particles with a particle size of 800-1200 m, as shown in FIG. 1.

Example 19

1000 g of adsorbent powders was evenly mixed with 90 g of polyformaldehyde and 90 g of polyvinyl chloride, the obtained mixture was added into a beaker containing 3000 g of N-methylpyrrolidoneto be ultrasonically treated and stirred, 50 g of hydroxyethyl cellulose was dissolved into 62.5 mL of isopropanol, the dissolved mixture was dropwise added into the N-methylpyrrolidone solution, stirred and subjected to ultrasonic dispersion for 4 h, then the flow speed of the mixed solution was adjusted to 20 mL/min, the speed of the airflow was adjusted to 4 mL/min, i.e., the liquid flow rate: airflow rate=5:1, a container was prepared under an spray outlet, the formulated mixed solvent of the receiving solution methanol and water was stirred, at this moment, the sprayed drips were solidified into spherical particles with a particle size of 1200-3000 m, as shown in FIG. 1.

Example 20

After titanium based adsorbent particles were subjected to suction filtration until there was no water on its surface, 40 g of titanium based adsorbent particles were weighed and filled into an adsorption column (size: 10*400 mm), 250 mL of 0.5 mol/L hydrochloric acid solution was sucked by using a peristaltic pump to perform elution pretreatment on the adsorbent particles, a solution having a lithium concentration of 1 g/L was sucked for a dynamic adsorption experiment, an adsorption saturation volume was 280 mL, a saturation adsorption amount was 20 mg/g, followed by desorbing with 200 mL of hydrochloric acid. The elution rate of Li was 90%.

Example 21

After manganese based adsorbent particles were subjected to suction filtration until there was no water on its surface, 40 g of titanium based adsorbent particles were weighed and filled into an adsorption column (size: 10*400 mm), 250 mL of 0.25 mol/L hydrochloric acid solution was sucked by using a peristaltic pump to perform elution pretreatment on the adsorbent particles, a solution having a lithium concentration of 0.1 g/L was sucked for a dynamic adsorption experiment, an adsorption saturation volume was 5 L, a saturation adsorption amount was 35 mg/g, followed by desorbing with 300 mL of hydrochloric acid. The elution rate of Li was 99%.

Comparative Example 1

To test the thermal stability of a sample, thermogravimetric analysis was performed on the sample.

Figure 4:
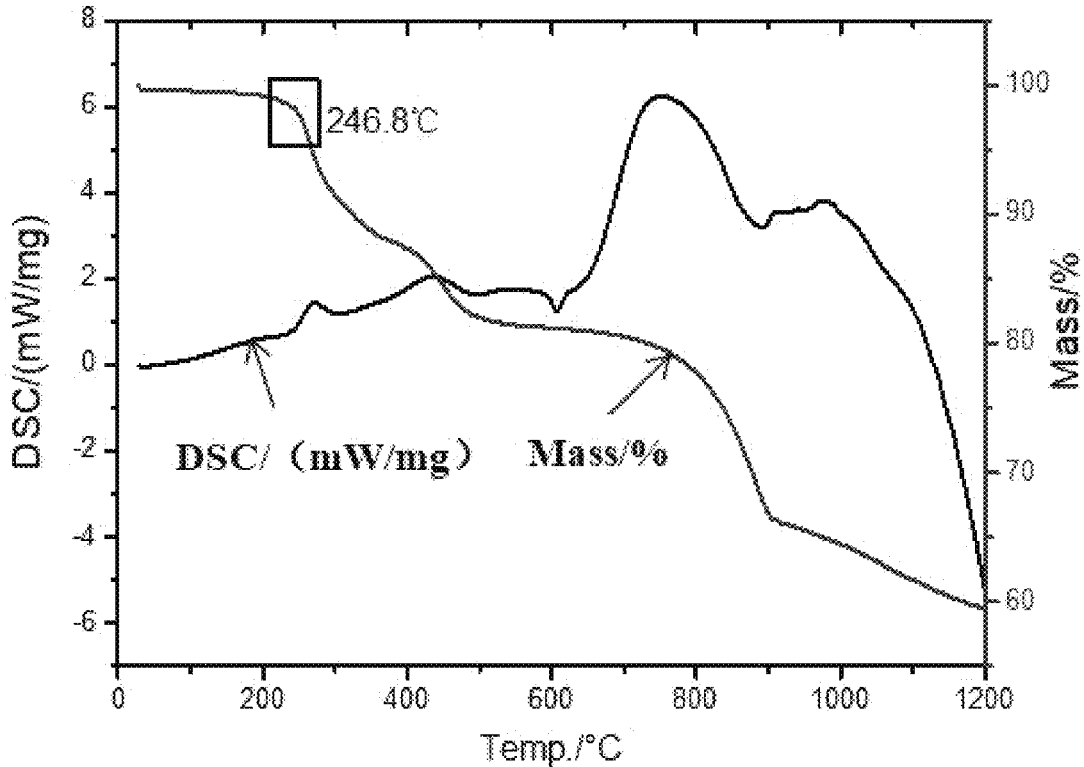
FIG. 4 is a thermal weight loss graph of a sample in comparative example 1.

It can be seen from FIG. 4 that when the adsorbent particles are heated at 0-246.8° C., there is basically no weight loss; when the temperature exceeds 246.8° C., sample particles start to be thermally decomposed, a lithium ion adsorbent needs a certain temperature resistance when being used for ion exchange column filling, but an adsorption treatment limiting temperature does not exceed 100° C. The adsorbent particles prepared in the present application have no structure decomposition and weight loss within 100° C., and therefore can meet the requirements on industrial use.

Comparative Example 2

To verify whether the structure of adsorbent particles changes after being heated for 6 h at 100° C., infrared testing was performed before and after heating for comparison.

Figure 5:
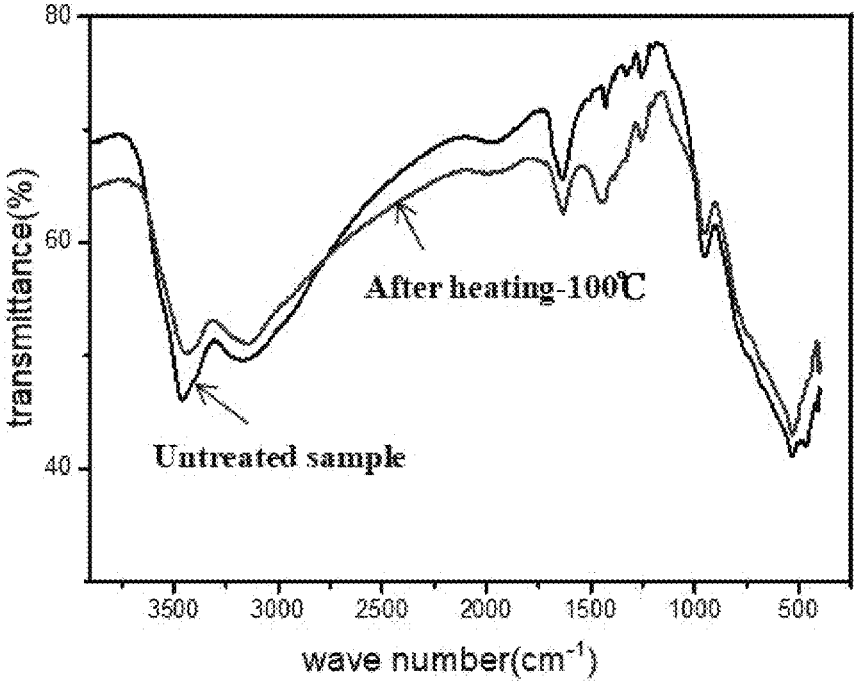
FIG. 5 is an infrared spectrum of a sample in comparative example 2 before and after heating.

It can be seen from FIG. 5 that the characteristic peak structure of the compound does not change, indicating that the structure performance of this adsorbent particle is not obviously damaged at a limiting temperature of 100° C.

Comparative Example 3

To verify the pressure resistance of the adsorbent particle, the strength of the adsorbent particle was tested in a manner of determining a penetrating and grinding ball rate via ball milling. The method was as follows: 40 mL of adsorbent particles were taken and then put into a ball milling pot together with 50 mL of pure water, 6 20 mm porcelain balls were added into the pot, and a ball milling program was set as ball milling for 1 h at 20 Hz (10 MPa), 15 Hz (7.5 MPa) and 10 Hz (5 MPa).

The penetrating and grinding ball rate S (%) was calculated according to formula (1):

$$S = \frac{m_1}{m_1 + m_2} \times 100 \qquad (1)$$

In the formula, $m_1$—mass of spherical particle, g; $m_2$—mass of broken particle, g.

TABLE 3

| Parameters and results for penetration and grinding test | | | | |
|---|---|---|---|---|
| Fre-quency (Hz) | Pressure (Mpa) | Ball grinding time (h) | Sphericity ratio (%) | Morphological phenomenon |
| 20 | 10 | 1 | 100 | Slight deformation after 1 h |
| 15 | 7.5 | 1 | 100 | No obvious deformation in 2 h |
| 10 | 5 | 1 | 100 | No obvious deformation in 2 h |

Figure 6:
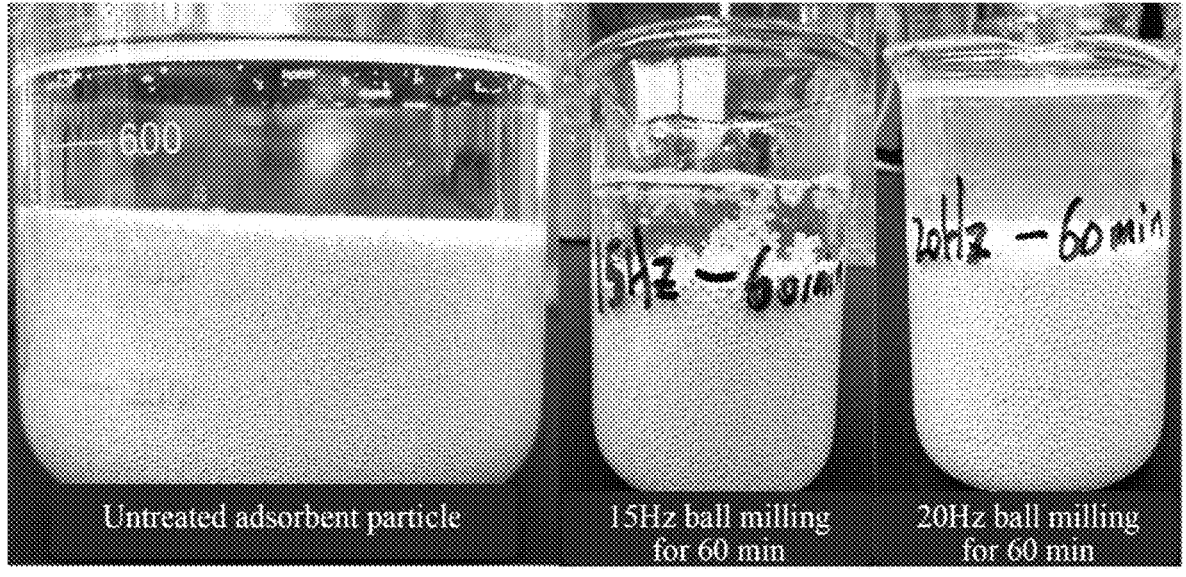
FIG. 6 is a morphology comparison graph of adsorbent particles in comparative example 3 after ball grinding.

After penetration and grinding testing, the adsorbent particles were sieved and weighed, and there was no weight loss for adsorbent particles after ball milling under different strengths. After ball milling for 1 h at 10-15 Hz, there is no phenomenon of powder detachment, as shown in FIG. 6, spherical particles still maintain a complete spherical shape, and the solution is clear; after ball milling for 1 h at 20 Hz, there is no obvious deformation, but the solution becomes slightly turbid, indicating that maximum resisted pressure is no more than 10 MPa under the penetration and grinding conditions, the maximum pressure generated by a conventional ion exchange column has a pressure of no more than 5 MPa and does not directly act on the adsorbent particles, however, the forming adsorbent particles prepared in the present application can withstand the pressure of up to 7.5 MPa, which can meet the requirements on industrial ion exchange column filling.

Comparative Example 4

To test the acid/base resistance of the adsorbent particle, the ion losses of (lithium ions had been removed) aluminum based adsorbent particles and titanium based adsorbent particles treated by 1 mol/L hydrochloric acid and a sodium hydroxide solution for 5 days, 10 days, 30 days and 60 days in a static state were comparison, and the ion loss of (lithium ions had been removed) adsorbent particles that were not granulated was tested under the same conditions for comparison study. 50 g of adsorbent particles and 25 g of adsorbent powders (the conversion value of adsorbent powder loaded with adsorbent particles was 22.5 g) were taken and soaked with 2 L of hydrochloric acid and sodium hydroxide, ion loss was tested by intermittent sampling. The results are seen in Table 4 and Table 5.

TABLE 4

| Ion loss of aluminum based adsorbent after acid and base treatment | | | | | |
|---|---|---|---|---|---|
| Treatment condition | Standing time (day) | Aluminum based adsorbent powders | | Aluminum based adsorbent particles | |
| | | Li (mg/L) | Al (mg/L) | Li (mg/L) | Al (mg/L) |
| 1 mol/L sodium hydroxide | 5 | 0.18 | 5.01 | 0.03 | 1.78 |
| | 10 | 0.29 | 7.32 | 0.03 | 1.67 |
| | 30 | 0.33 | 7.55 | 0.03 | 1.92 |
| | 60 | 0.29 | 8.12 | 0.03 | 1.97 |

TABLE 4-continued

| Ion loss of aluminum based adsorbent after acid and base treatment | | | | | |
|---|---|---|---|---|---|
| Treatment condition | Standing time (day) | Aluminum based adsorbent powders | | Aluminum based adsorbent particles | |
| | | Li (mg/L) | Al (mg/L) | Li (mg/L) | Al (mg/L) |
| 1 mol/L hydrochloric acid | 5 | 0.22 | 4.27 | 0.03 | 0.54 |
| | 10 | 0.31 | 5.22 | 0.03 | 0.57 |
| | 30 | 0.29 | 5.34 | 0.03 | 0.73 |
| | 60 | 0.35 | 5.51 | 0.03 | 0.68 |

It can be seen from Table 4 that after treatment with 1 mol/L sodium hydroxide and hydrochloric acid, the ion loss of the adsorbent powder that is not granulated by the method provided by the present application is more severe than that of formed particle. This is mainly because the formed particle has a layer of polymer shell, which can resist corrosion, acid and base, and can take a skeleton support and protection effect on adsorbent powders.

TABLE 5

| Ion loss of aluminum based adsorbent after acid and base treatment | | | | | |
|---|---|---|---|---|---|
| Treatment condition | Standing time (day) | Aluminum based adsorbent powder | | Aluminum based adsorbent particle | |
| | | Li (mg/L) | Ti (mg/L) | Li (mg/L) | Ti (mg/L) |
| 1 mol/L sodium hydroxide | 5 | 1.23 | 0.52 | 0.58 | 0.012 |
| | 10 | 1.72 | 0.52 | 0.66 | 0.012 |
| | 30 | 1.69 | 0.52 | 0.81 | 0.012 |
| | 60 | 2.23 | 0.52 | 1.29 | 0.012 |
| 1 mol/L hydrochloric acid | 5 | 3.44 | 0.52 | 1.17 | 0.008 |
| | 10 | 5.66 | 0.52 | 1.26 | 0.008 |
| | 30 | 5.69 | 0.52 | 1.52 | 0.008 |
| | 60 | 6.71 | 0.52 | 2.72 | 0.008 |

It can be seen from Table 5 that after treatment with 1 mol/L sodium hydroxide and hydrochloric acid, the ion loss of the titanium based adsorbent powder that is not granulated by the method provided by the present application is more severe than that of formed particle. Similarly, this is because the formed particle has a layer of polymer shell, which can resist corrosion, acid and base, and can take skeleton support and protection effects on adsorbent powders. In addition, the titanium based adsorbent is stable in its own structure, titanium ions are not easily lost and basically have no loss after acid and base soaking treatment, and the stability of the performance structure can be ensured after granulation.

In addition, the inventor of this case can conduct test by reference to the foregoing examples based on other raw materials, process operations and process conditions involved in this specification and obtains ideal results.

Although the present application has been described with reference to illustrative embodiments, those skilled in the art will understand that various other changes, omissions and/or additions can be made without departing from the spirit and scope of the present application, and elements of the embodiments can be replaced with substantive equivalents. In addition, many modifications can be made without departing from the scope of the present application to adapt specific situations or materials to the teachings of the present application. Therefore, this patent is not intended to make the present application limited to the specific embodiments disclosed for executing the present application, but intended to include all embodiments within the scope of the appended claims. Furthermore, unless specifically stated, any use of terms such as first and second does not imply any order or importance, rather than the use of terms such as first and second to distinguish one element from another.

What is claimed is:

1. A preparation method of a spherical lithium adsorbent, comprising:

dry mixing an adsorbent and a forming agent followed by evenly mixing with a first solvent to form a mixed solution, and adding a thickening and pore forming agent to obtain a mixed system; and spraying out the mixed system from a nozzle of a spray device and receiving sprayed drips using a second solvent as a receiving solvent so that a solid-phase spherical lithium adsorbent is obtained via a phase conversion, wherein a particle size of the spherical lithium adsorbent is in a range from 100 μm to 1000 μm, and wherein the adsorbent is one or more selected from the group consisting of a lithium titanium ion sieve, an aluminum based adsorbent, a lithium manganese ion sieve, graphite powders, and a graphene oxide;

the forming agent is one or more selected from the group consisting of polyvinyl chloride, polyethersulfone, polyvinyl acetate, polyformaldehyde, polyamide, polysulfone, and polyimide; and the thickening and pore forming agent is one or more selected from the group consisting of hydroxyethyl cellulose, carboxymethyl cellulose, polyethylene glycol, and sodium alginate.

2. The preparation method according to claim 1, wherein the aluminum based adsorbent is one or more selected from the group consisting of $LiCl \cdot 2Al(OH)_3 \cdot nH_2O$ and $LiAl_2(OH)_6Cl \cdot nH_2O$; and/or a weight ratio of the adsorbent to the forming agent is 1:1-9:1.

3. The preparation method according to claim 1, wherein the first solvent comprises a combination of any one or more than two of N-methylpyrrolidone, N,N-dimethylformamide, N, N-dimethylacetamide, and tetrahydrofuran; and/or, the forming agent accounts for 6%-40% by a weight of the first solvent.

4. The preparation method according to claim 1, comprising:

dissolving the thickening and pore forming agent into a third solvent and then adding an obtained mixture into the mixed solution, stirring and ultrasonically treating to obtain the mixed system; and/or, a mass ratio of the thickening and pore forming agent to the forming agent being 6:100-1:3.

5. The preparation method according to claim 4, wherein the third solvent comprises a combination of any one or more than two of ethanol, cyclohexanol and isopropanol; and/or, the thickening and pore forming agent accounts for 3%-10% by a weight of dry mixed powders; and/or, the thickening and pore forming agent accounts for 10%-80% by a weight of the third solvent.

6. The preparation method according to claim 1, wherein the second solvent comprises a combination of any one or two of alcohol and water; wherein the alcohol comprises a combination of any one or more than two of methanol, n-propanol, isopropanol, and ethanol, and the water is deionized water; and wherein a volume ratio of the alcohol to the water is 30:70-90:10.

7. The preparation method according to claim 1, comprising:

extracting the mixed system using an extraction device to be input into a first inlet of the spray device, and introducing a gas into a second inlet; and spraying out the mixed system via the nozzle of the spray device, allowing the sprayed drips to fall in the second solvent based on the second solvent as the receiving solvent, so as to obtain the solid-phase spherical lithium adsorbent via the phase conversion.

8. The preparation method according to claim 7, wherein a ratio of a liquid extraction speed of the extraction device to an airflow speed of the gas is 1:2-5:1; and/or, the gas comprises a combination of any one or more than two of air, carbon dioxide, nitrogen, and argon.

9. A spherical lithium adsorbent, wherein a particle size of the spherical lithium adsorbent is in a range from 100 μm to 1000 μm, and wherein a preparation method of the spherical lithium adsorbent comprises:

dry mixing an adsorbent and a forming agent followed by evenly mixing with a first solvent to form a mixed solution, and adding a thickening and pore forming agent to obtain a mixed system; extracting the mixed system using an extraction device to be input into a first inlet of the spray device, and introducing a gas into a second inlet; and spraying out the mixed system from a nozzle of a spray device and receiving sprayed drips using a second solvent as a receiving solvent so that a solid-phase spherical lithium adsorbent is obtained via a phase conversion; wherein the adsorbent is one or more selected from the group consisting of a lithium titanium ion sieve, an aluminum based adsorbent, a lithium manganese ion sieve, graphite powders, and a graphene oxide;

the forming agent is one or more selected from the group consisting of polyvinyl chloride, polyethersulfone, polyvinyl acetate, polyformaldehyde, polyamide, polysulfone, and polyimide; and the thickening and pore forming agent is one or more selected from the group consisting of hydroxyethyl cellulose, carboxymethyl cellulose, polyethylene glycol, and sodium alginate.

10. Use of the spherical lithium adsorbent according to claim 9 in a field of an absorption column filling.

11. The spherical lithium adsorbent according to claim 9, wherein the aluminum based adsorbent is one or more selected from the group consisting of $LiCl \cdot 2Al(OH)_3 \cdot nH_2O$ and $LiAl_2(OH)_6Cl \cdot nH_2O$; and a weight ratio of the adsorbent to the forming agent is 1:1-9:1.

12. The spherical lithium adsorbent according to claim 9, wherein in the preparation method, the first solvent comprises a combination of any one or more than two of N-methylpyrrolidone, N,N-dimethylformamide, N,N-dimethylacetamide, and tetrahydrofuran; and/or, the forming agent accounts for 6%-40% by a weight of the first solvent.

13. The spherical lithium adsorbent according to claim 9, wherein the preparation method comprises: dissolving the thickening and pore forming agent into a third solvent and then adding an obtained mixture into the mixed solution, stirring and ultrasonically treating to obtain the mixed system; and, a mass ratio of the thickening and pore forming agent to the forming agent being 6:100-1:3.

14. The spherical lithium adsorbent according to claim 13, wherein in the preparation method, the third solvent comprises a combination of any one or more than two of ethanol, cyclohexanol and isopropanol; and/or, the thickening and pore forming agent accounts for 3%-10% by a weight of dry mixed powders; and/or, the thickening and pore forming agent accounts for 10%-80% by a weight of the third solvent.

15. The spherical lithium adsorbent according to claim 9, wherein in the preparation method, the second solvent comprises a combination of any one or two of alcohol and water; wherein the alcohol comprises a combination of any one or more than two of methanol, n-propanol, isopropanol, and ethanol, and the water is deionized water; and wherein a volume ratio of the alcohol to the water is 30:70-90:10.

16. The spherical lithium adsorbent according to claim 1, wherein in the preparation method, a ratio of a liquid extraction speed of the extraction device to an airflow speed of the gas is 1:2-5:1; and the gas comprises a combination of any one or more than two of air, carbon dioxide, nitrogen, and argon.

* * * * *